United States Patent [19]

Faigle

[11] 4,371,445
[45] Feb. 1, 1983

[54] ARRANGEMENT IN PAIRS OF PLASTIC SLIDING ON PLASTIC IN TRIBOLOGIC SYSTEMS

[75] Inventor: Heinz Faigle, Hard, Austria

[73] Assignee: Heinz Faigle KG, Hard, Austria

[21] Appl. No.: 49,163

[22] Filed: Jun. 18, 1979

[30] Foreign Application Priority Data

Mar. 14, 1979 [AT] Austria ................................ 1930/79

[51] Int. Cl.³ .......................... C10M 5/10; C10M 5/00
[52] U.S. Cl. ..................................... 252/12; 252/12.2;
 252/12.4; 252/12.6
[58] Field of Search ....................... 252/12, 12.2, 12.4,
 252/12.6, 10

[56] References Cited

U.S. PATENT DOCUMENTS

| | | | |
|---|---|---|---|
| 3,094,376 | 6/1963 | Thomas ............................ | 264/135 |
| 3,344,064 | 9/1967 | Brady et al. ...................... | 252/12 |
| 3,629,103 | 12/1971 | Korshak et al. ................... | 252/12 |
| 3,652,408 | 3/1972 | Korshak et al. ................... | 252/12 |
| 3,994,847 | 11/1976 | Marcantonio et al. ............. | 252/12 |
| 4,075,111 | 2/1978 | Bilow et al. ...................... | 252/12 |
| 4,108,080 | 8/1978 | Garner et al. .................... | 252/12 |
| 4,202,780 | 5/1980 | Brendle ........................... | 252/12 |

OTHER PUBLICATIONS

"Plastic Bearings", by J. C. Benedyk in SPE Journal, Apr. 1970, vol. 26, pp. 78-85.

*Primary Examiner*—Jacqueline V. Howard
*Attorney, Agent, or Firm*—Toren, McGeady and Stanger

[57] ABSTRACT

The invention relates to a tribological system with plastic/plastic pairings, especially sliding bearings, in which plastics—optionally supported by lubricants—carry out motions in sliding friction relative to one another and at least one of the main sliding partners and/or auxiliary partner is a plastic, containing polar, cyclic compounds, in which the cyclic part of the molecule on at least one side is coupled directly to an atom of Group V (especially nitrogen) or of Group VI (especially oxygen and/or sulfur) of the Periodic System of the elements, or in which the rings contain the atoms mentioned. Excellent sliding conditions are obtained when the polar synthetic materials, containing the cyclic compound(s), either are monovalent, cyclic chain polymers or chain polymers in the form of polyheterocycles ("semi-ladder polymers") or chain polymers in the form of monovalent polyheterocycles or fully cyclic chain polymers ("ladder polymers") or homopolymers or copolymers or polymer mixtures within the above groups or of these groups or with other molecules or polymers and either both main polymers are polar and contain different cyclic compounds, while the auxiliary sliding partner however is nonpolar, or that both main sliding partners are nonpolar, while the auxiliary sliding partner however is polar and contains cyclic compounds.

21 Claims, 12 Drawing Figures

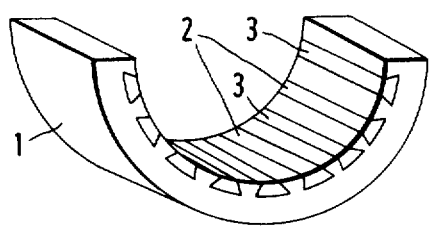
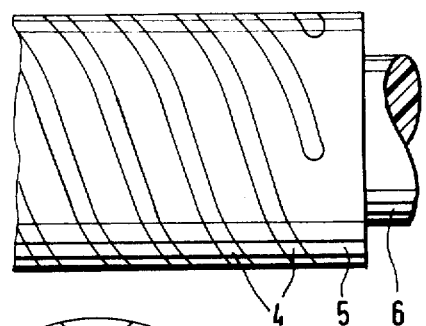
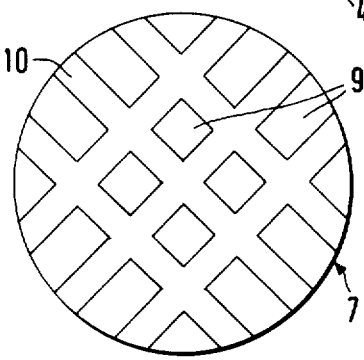
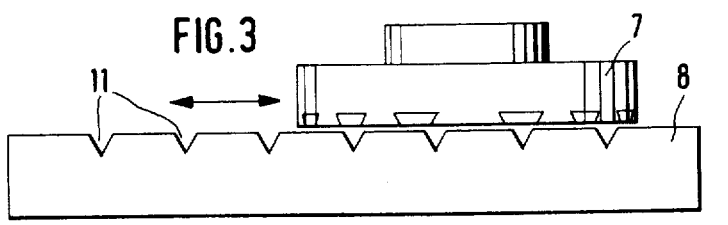
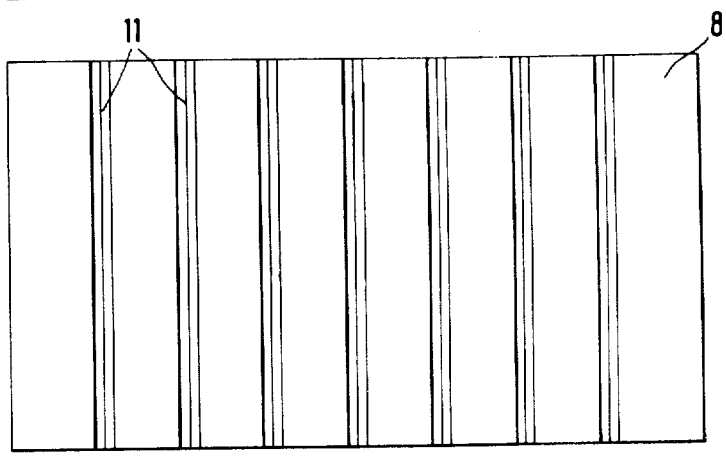

ARRANGEMENT IN PAIRS OF PLASTIC SLIDING ON PLASTIC IN TRIBOLOGIC SYSTEMS

The invention relates to a tribological system with plastic/plastic pairings, especially sliding bearings, in which plastics—optionally supported by lubricants—carry out motions in sliding friction relative to one another and at least one of the main sliding partners and/or auxiliary partners is a plastic, containing polar, cyclic compounds, in which the cyclic part of the molecule on at leastone side is coupled directly to an atom of Group V (especially nitrogen) or of Group VI (especially oxygen and/or sulfur) of the Periodic System of the elements, or in which the rings contain the atoms mentioned.

Ever since plastics have been used in tribological systems (e.g. sliding bearings or gear bearings), thought has been given primarily to a pairing of a plastic element with a metallic machine element. There is an extensive literature which deals with friction and wear problems of such a system, as well as with the surface structures which are formed. Moreover, it has also been suggested that dry lubricants, for example, PE, PTFE or $MoS_2$, be incorporated in the plastics or in the surfaces of these plastics.

Pairings of plastics against plastics have become known in tribological systems only relatively lately and, until now, only to a rather modest extent. For example, the VDI Standard 2541 mentions the pairings PA/-POM, PA/HDEP, PETP/POM, PBTP/APA. A few of these plastics, filled with glass fiber, glass spheres, graphite or PE, are also listed. In the same Standard, it is also stated that plastic/plastic pairings tend towards lower but constant sliding friction values than plastic/-metal pairings.

In investigating plastic/metal pairings, it was observed that, in general, those polymers, which contain cyclic groups in their molecules or which are completely cyclic, exhibit particularly poor friction and wear properties, especially when oxygen or sulfur is linked to their cyclic groups. For example, polyphenylene oxide and polyphenylene sulfide are not good sliding partners for steel. This is surprising in view of the experience gained with metallic pairs that the possibility of access of oxygen or the addition of elemental sulfur or of organosulfur compounds has a positive effect on the friction zone.

Recently, a surprising effect was discovered in plastic sliding pairs, namely, that especialdly the just mentioned polyphenylene oxides of polyphenylene sulfides (sulfones, etc.) represent excellent sliding partners under certain conditions. This happened particularly when pairing against nitrogen-containing plastics. Moreover, a positive effect was found in the presence of a nonpolar medium at the site of sliding friction. The (frequently detectable) lubricant-like effect of such nonpolar media appeared to be of less importance than the -speculatively expressed - electrostatic separation of the other two sliding partners.

Accordingly, tribological systems in which plastics run against one another, have proven to be successful when both main sliding partners are polar and, in addition, the initially mentioned conditions are fulfilled.

Furthermore, such systems appear to be particularly successful when there is between the two main sliding partners an auxiliary sliding partner, which behaves differently from at least one of the main sliding partners in regard to polarity.

In particular, such a tribological system may consist of two main sliding partners which are polar and an auxiliary partner which is nonpolar.

Conversely, the two main sliding partners may be nonpolar, whereas the auxiliary sliding partner is polar and contains cyclic compounds.

In this connection, "nonpolar" is understood to mean that the plastic concerned is in itself nonpolar (e.g. PE), or acts in a nonpolar fashion towards the outside as a result of the internal, mutual neutralization of the polarities of individual molecules (e.g. PTFE).

In addition to the requirement, already mentioned initially, that at least one of the sliding partners should have an at least partially cyclic structure, it has also been mentioned that different polarities have a favorable effect on the sliding friction relationships and results (e.g. in regard to minimizing wear). This effect at present is still completely surprising.

It is conceivable to construct the above-mentioned auxiliary sliding partner in the form of an intermediate bushing or film, which runs between the two main sliding partners. This can be realized particularly easily when one of the main sliding partners is a journal-bearing bushing and the other main sliding partner a sleeve mounted on the shaft.

The auxiliary sliding partner must not necessarily be an independently definable component in the sense of a machine element. It may also, for example, be a dry lubricant (e.g. PE or PTFE), which is integrated in one or both of the main sliding partners (e.g. incorporated in particle form) and given off gradually in the friction zones during the sliding or wear process. It is equally conceivable—and already realized in sliding pairs between plastics and metals—that the auxiliary sliding partner is degraded as a result of tribological processes or changes into other products—possibly assisted by the degradation products of the main sliding partners—whereby such degradation or conversion products produce lubricating materials which can be described as auxiliary sliding partners in the above-described sense. In any case, it is important that such degradation or conversion products are continuously given off in the friction zone.

According to the above details, the auxiliary sliding partner may by all means consist of a plastic. It is equally conceivable however that it consists of a very low molecular weight plastic or only of oligomeric or monomeric substances.

According to information in the literature, the following possibilities in respect to polarity or nonpolarity arise for plastics;

| | |
|---|---|
| (a) The molecules are completely nonpolar | = type OO |
| (b) The molecules are positively active | = type PO [+ −] |
| (c) The molecules are negatively active | = type ON [ + −] |
| (d) The molecules are positively and negatively active | = type PN [+ −] |

Investigations of plastic/plastic sliding pairs have shown that apparently sliding partners of unidirectional polarity (either positive/positive or negative/negative) should run against one another, possibly with the interpositioning of a nonpolar auxiliary sliding partner.

More recent investigations however indicate that, in the case of an interpositioning of a nonpolar auxiliary sliding partner, a difference in the polarity of the main sliding partners (either in the unidirectional intensity or in the opposite polarity) is of importance.

Here also once again, there is no speculative hypothesis which is appropiate. It is only possible to describe the surprising effects which are referred to in the further description or in the patent claims.

The following materials come into consideration as plastic sliding partners having cyclic compounds (in the sense of the previous description):

(a) monovalent cyclic chain polymers (see Table 2a for examples)

(b) Chain polymers in the form of polyheterocyclics, the so-called "semi-ladder polymers". (see Table 2b for examples)

(c) Chain polymers in the form of monovalent polyheterocyclics (see Table 2c for examples)

(d) Fully cyclic chain polymers, the so-called "ladder polymers". (see Table 2d for examples).

(e) Homopolymers or copolymers or polymer mixtures within the above-mentioned groups (a) to (d) or of the above groups with one another or with other molecules or polymers (in the latter case, for example, a mixture of poly(2,6-dimethylphenyleneoxide with polystyrene), and are tribologically paired in such a manner that either both main sliding partners are polar and contain different cyclic compounds and/or different atoms or chemical groups which are coupled to the cyclic part, in which case however the auxiliary sliding partner is nonpolar, or both main sliding partners are nonpolar and the auxiliary sliding partner is polar and contains cyclic compounds.

As already mentioned initially, it appears to be of importance to have atoms of sulfur, oxygen and nitrogen as constituents. The addition of phosphorus compounds has also been shown to have favorable effects. In the pairings investigated, good results were achieved.

(a) when one of the sliding partners contained atoms of sulfur in its molecule and one of the other sliding partners atoms of oxygen, (b) when one of the sliding partners contained atoms of sulfur in its molecule and one of the other sliding partners atoms of nitrogen, (c) when one of the sliding partners contained atoms of oxygen in its molecule and one of the other sliding partners those of nitrogen, (d) when one of the sliding partners or several of the sliding partners contained two, three or four types of atoms selected from sulfur, nitrogen and phosphorus, in its molecule.

Among the plastic/plastic sliding pairs tested, the following systems have proven to be good sliding partners:

(a) that one of the sliding partners is a polyphenylene oxide, preferably a poly(2,6-dimethylphenyleneoxide) (optionally in admixture with other polymers, for example, polystyrene) and one of the other sliding partners is either an aromatic polyamide* or a polyalkylene terephethalate and an optional, accompanying auxiliary sliding partner consists of polyalkylene, preferably polyethylene, or polytetrafluoroethylene or is a low molecular weight or oligormeric or monomeric hydrocarbon.

*or a polyimide or a polyamideimide or a polybenzimidazole (b) that at least one of the sliding partners is a sulfur-containing plastic, for example
either a polyaryl sulfone
or a polyaryl sulfide
or a polyaryl sulfonate
and one of the other sliding partners is
either an aromatic polyamide*
or a polyalkylene terephthalate (e.g. polyethylene terephthalate or polybutylene terephthalate)
and an optional, accompanying auxiliary sliding partner consists of polyalkylene, preferably polyethylene,
or of polytetrafluoroethylene or is a low molecular weight or oligomeric or monomeric hydrocarbon.

The inventive sliding partners may either be plastics in the pure state or plastics which contain additives, fillers, lubricants and reinforcing materials known form the state of the art. Such additives may be crystallization nuclei, processing aids, aging resistors, heat stabilizers, inorganic and organic dry lubricants, fibers, for example of glass, boron and carbon, talc, glass spheres, graphite, etc.

This patent application relates, possibly in pioneering fashion, to a substantial sector of tribological plastic/plastic pairings. It will doubtlessly have to be supplemented by widely scattered experimental data. Presently available individual investigations of a large number of tribological pairings justify the relatively broad base of the objective application. Various pairings from these investigations were subjected to detailed tests, whose results are listed schematically in Table 1, together with further findings and confirmations, which are itemized below:

In accordance with the invention, it is a requirement that the nonpolar sliding partner(s) either is (are) nonpolar in itself, e.g. PE, or act(s) in a nonpolar fashion towards the outside as a result of the internal, mutual neutralization of the polarities of the individual molecules, e.g. PTFE.

This requirement was confirmed. In addition to PE (polyethylene), PP (polypropylene), PS (polystyrene) and PIB (polyisobutylene) also proved to be successful as inherently nonpolar partners.

Among the synthetic materials in which the individual polarities compensate one another towards the outside, that is, in which the centers of internal positive and negative charges largely overlap, PVDC (polyvinylidene chloride) as well as PTFE (polytetrafluoroethylene), has produced advantageous results in specific pairings.

According to some of the types of structure described, an auxiliary sliding partner should run along as an independent element or be integrated in at least one of the main sliding partners in such a way that parts of it—or degradation products or conversion products—are constantly given off in the friction zone.

For this purpose, the following combinations have established themselves in the course of a series of experiments:

| Main Sliding Partner I polar, cyclic A | Main Sliding Partner II polar, cyclic B |
|---|---|
| 1.1 with nonpolar auxiliary partner | no auxiliary partner |
| 1.2 no auxiliary partner — | with nonpolar auxiliary partner |

-continued

| | |
|---|---|
| 2.0 auxiliary partner (a), nonpolar | auxiliary partner (a), nonpolar |
| 3.1 auxiliary partner (a), nonpolar | auxiliary partner (b), nonpolar |
| 3.2 auxiliary partner (b), nonpolar | auxiliary partner (a), nonpolar |

| Main Sliding Partner I | Auxiliary Partner | Main Sliding Partner II | Auxiliary Partner |
|---|---|---|---|
| 4.1 nonpolar (a) | pol. cyc. A | nonpolar (a) | — |
| 4.2 nonpolar (a) | — | nonpolar (a) | pol. cyc. A |
| 5.1 nonpolar (a) | pol. cyc. A | nonpolar (a) | pol. cyc. B |
| 5.2 nonpolar (a) | pol. cyc. B | nonpolar (a) | pol. cyc. A |
| 6.1 nonpolar (a) | pol. cyc. A | nonpolar (b) | — |
| 6.2 nonpolar (a) | — | nonpolar (b) | pol. cyc. A |
| 7.1 nonpolar (a) | pol. cyc. A | nonpolar (b) | pol. cyc. B |
| 7.2 nonpolar (a) | pol. cyc. B | nonpolar (b) | pol. cyc. A |

In considering the above Tables, the various reversals of pairings may appear to be unnecessary at first glance. However, they are included in order to draw attention to the tribolotechnological phenomenon that, in the case of a X/Y pairing, very different results generally are obtained depending on whether X or Y is the stationary or moving sliding friction partner.

Moreover, in the case of the inventive sliding pairs, there is a difference depending on whether, for example, partner A contains component (a) and partner B component (b), that is, when Aa/Bb is paired, or whether a component exchange is carried out and Ab/Ba are now paired.

In summary, the main possibilities may accordingly be adhered to that a cyclic main partner may contain a nonpolar auxiliary partner and its other main partner none,
both cyclic main partners may contain a nonpolar auxiliary partner,
these auxiliary partners are the same,
they are different,
one nonpolar main partner may contain a polar, cyclic auxiliary and its other main partner none,
both contain a cyclic, polar auxiliary partner,
these auxiliary partners are the same,
they are different, or, in so far as it runs along as an independent bearing component, this auxiliary sliding partner is paired analogously to the above or in combination with the above.

Moreover, it should be mentioned that a nonpolar partner may consist of several materials, for example, of a mixture of two or more of the following synthetic materials, PE, PP, PIB, PS, PTFE, PVDC, which in turn may be present in various forms, such as, for example, powder, granules, fibers, felt, fabric or netting.

It is also possible to mix these forms up to the stage in which a component is shaped. For example, a felt of PTFE fibers may be bonded with PS powder, which is scattered between the fibers and subsequently fused, or a PP film may contain granules of UHMWPE, PIB or PVDC.

These last-mentioned constructions are conceivable especially when the auxiliary partner is not integrated into one or both of the main partners, but runs between the main sliding partners as a component with its own shape in the form of an intermediate bushing or an intermediate film or is itself a main sliding partner.

The preceding comments, concerning form combinations in nonpolar partners, obviously apply also in the reverse sense to polar partners.

For example, an element, shaped from PPS, may contain powder or fibers of PAN (polyacrylonitrile) and/or PETP and an element, shaped from PI or PAI and running against the first element, may contains those of PAA and/or PA.

It is appropriate at this time to point out once again that the inventive sliding partners may be synthetic materials in the pure state, as well as synthetic materials which contain additives, fillers, lubricants and reinforcing materials known from the state of the art.

Such additives should be selected in such a manner that they advantageously enhance the inventive difference in the chemical structure of the sliding partners or, at the very least, do not impair this difference significantly. This is strictly the case in the above examples.

Finally, the auxiliary partner may also be incorporated in macrostructure into the main sliding partner. Examples of this are shown in FIGS. 1 to 12.

FIG. 1 shows a bearing half shell, in whose parent substance (1) the auxiliary sliding partners (2) and (3) are embedded at right angles to the direction in which the shaft (not drawn) is running.

FIG. 2 shows an auxiliary sliding partner (4) which is incorporated spirally in a sleeve (5), which is fitted on a shaft (6).

Figure 7:

FIG. 3 schematically represents the pairing of a sliding mushroom head (7) with a sliding plate (8) in elevation.

FIG. 4 shows a plan view of the contact surface of the sliding mushroom head (7), which consists of the main sliding partner I (9) and an auxiliary sliding partner (10), which is arranged cross-shaped and diagonally to the running direction. The sliding plate (8) is to be seen in FIG. 5 in plan view on its contact surface. It has grooves (11).

As shown in FIG. 4, the surface of the main sliding partner (9) projects in island fashion into the contact surface. The reverse is also possible. In this case, the auxiliary sliding partner would project in island fashion into the sliding surface.

Figure 6:
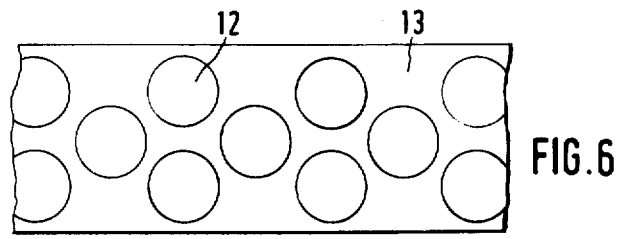

FIG. 6 shows a sliding plate (13) with island-like, round disks (12) from a partner material in plan view and FIG. 7 in cross section.

Figure 8:
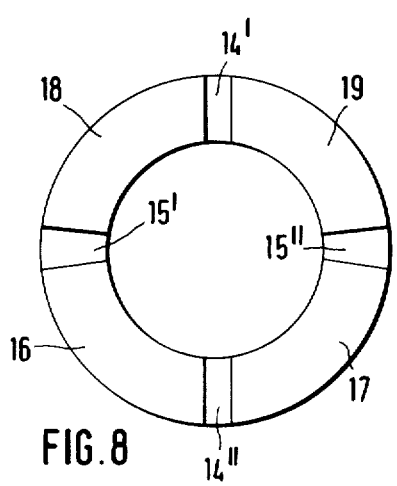

FIG. 8 shows a plan view of a ring disk for taking up axially acting sliding-friction loads. As is shown, the slits may be parallel (14', 14") as well as radiating (15', 15").

Figure 9:
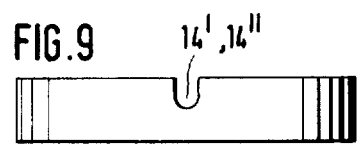
Figure 10:
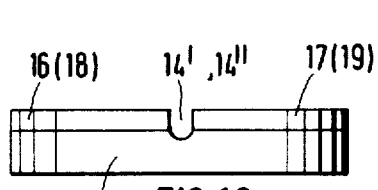

In FIGS. 9 and 10, the ring disk is shown in elevation. FIG. 9 shows a one-part disk and FIG. 10 one consisting of the basic body (20) and the sliding segments, which are separated by slits 14 and 15 and which are provided with the designations (17), (18), (19) and (20), in order to illustrate the possibilities of manufacture from two or four different materials.

Figure 11:
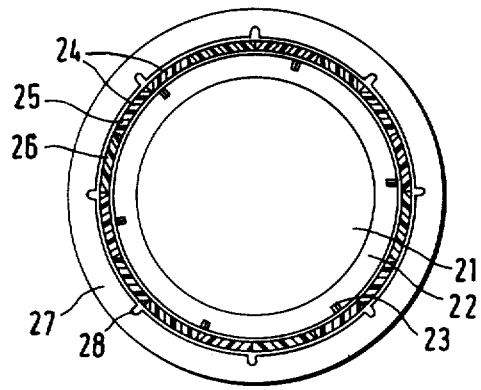

FIG. 11 is a diagrammatic sketch of a roller bearing in which some of the inventive details are used:

The main sliding partner I is a sleeve (22), which is fitted on and runs along with a shaft (21). This sleeve supports ledges (23) of a different material, which project into the friction surface. The auxiliary partner in this example, which runs along with the shaft (21) as an intermediate bushing (24), is composed of two materials, as shown schematically in the drawing by means of the sections (25) and (26). The outer bushing (27), which is provided with some slits (28) at right angles to the circumferential direction, is intended to be the main sliding partner II.

Figure 12:
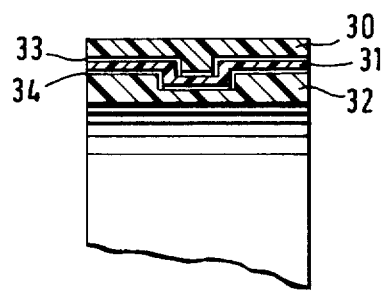

Finally, one of the numerous possibilities of producing plastic multilayer sliding partners, is outlined in FIG. 12. An intermediate bushing (31), which follows a shaft sleeve (32), is subsequently extruded or molded into a previously extruded or molded bushing (30). Slits (33) and (34) result from the shrinkage arising from the soldification and cooling of the consecutive bushing or sleeve layers.

Embodiments, similar to those shown in FIGS. 1 to 11, are known from the state of the art, even if they are carried out there with different materials and for different objectives or intentions. Different purposes are achieved with the inventive combination of materials. Presumably, as a result of the alternating pairing of materials in the sliding friction process between plastics, there is a tearing away of electrical charges or a polarization or, as a result of changes in material in the friction surface or as a result of the slits, there is a charge separation which represents one of the possibilities for electrostatic charging.

In accordance with the invention therefore, and on the basis of designs known from the state of the art, one or several auxiliary sliding partners in macroform are mounted in one or both main sliding partners. Preferably, the auxiliary sliding partners are arranged so as to project in strip fashion, spirally, cross-like or in island fashion into the friction surface and/or some or several or all of the friction surfaces are interrupted by slits, which preferably run stripwise at right angles to the direction of friction or are arranged spirally or cross-shaped. These slits may also be filled with strips of a different material, which correspond to the inventive directions for pairing. At or through their surface, the main sliding partners may also be subdivided by such slits or changes of material.

Finally, it must be mentioned that, as every tribologist will understand, Table 1 is only able to indicate tendencies. Considering the large number of experimental runs required for a tribological characterization in relation to the relatively short time since the introduction of the developmental work, it is obvious that only a very broad classification has been found until now. In particular, an extended proving test under limiting conditions—for example, high speed at low pressures and the reverse—may make it necessary to displace the sequence given in Table 1, quite apart from the fact that a single Table is insufficient for making a complete tribological statement.

In order to avoid misunderstandings, it should additionally be pointed out that mechanical, energetic and chemical causes and effects are closely superimposed in tribological systems. For example, it is well known that certain processes do not take place in autoclaves, but certainly do occur tribochemically under the same conditions of pressure and temperature. It is therefore entirely conceivable that, in a tribological system and at microsites and in microtime, the atoms mentioned in the preceding description (or molecular fragments or conversion containing such atoms) are liberated and have a positive effect on the sliding friction process.

The preceding description is directly mainly towards sliding bearings in which a shaft, covered with a plastic sleeve, is rotating in a plastic sliding-bearing bushing which is in any type of housing. It should still be mentioned that the system described is applicable to all sliding friction pairs, for example, to axel/wheel, axel/lever, lever/cam, flat sliding guides, gear pairs, roller-bearing applications, roller-bearing cages, sliding seals, etc.

| Key for the (largely standardized) Abbreviations | |
|---|---|
| CF | = carbon fibers |
| GF | = glass fibers |
| HDPE | = high-density polyethylene |
| PA | = polyamide |
| PA 6 | = polyamide from caprolactam |
| PA 66 | = polyamide from hexamethylene diamine and adipic acid |
| PA 11 | = polyamide from aminoundecanoic acid |
| PA 12 | = polyamide from laurin lactam |
| PAA-F | = polyarylamide fiber |
| PATP | = polyalkylene terephthalate (e.g. PBTP, PETP) |
| PBTP | = polybutylene terephthalate |
| PC | = polycarbonate |
| PE | = polyethylene |
| PETP | = polyethyleneterephthlate |
| POM | = polyoxymethylene (polyacetal) |
| POM hp | = polyoxymethylene homopolymer |
| POM cp | = polyoxymethylene copolymer |
| PPO | = polyphenylene oxide |
| PPO/PS | = polyphenylene oxide (generally poly(2,6-dimethylphenylene oxide)) in admixture with polystyrene |
| PPS | = polyphenylene sulfide |
| PPSU | = polyphenylene sulfone |
| PSUL | = polysulfone |
| PU | = polyurethane |
| PTFE | = polytetrafluoroethylene |
| UHMWPE | = ultrahigh molecular weight polyethylene |
| MoS$_2$ | = molybdenum disulfide |
| PAA | = polyarylamide |
| PI | = polyimide |
| PIB | = polyisobutylene |
| PP | = polypropylene |
| PS | = polystyrene |
| PVDC | = polyvinylidene chloride |
| PE-F | = PE fibers |
| PTFE-F | = PTFE fibers |
| PAI | = polyamideimide |
| PES | = polyether sulfone |
| PBIA | = polybenzimidazoles |

| Plastic Sliding Pairs on an RMH Roller Bearing Test Stand | | | | | |
|---|---|---|---|---|---|
| | Paarung | | Durchschnittsbewertung hinsichtlich Verschleiss, Reibwert und Belastbarkeit | | |
| Haupt-partner I | Haupt-partner II | Hilfs-partner (i), (z) | sehr gut | gut | fur be-stimmte Be-dingungen |
| PPS+GF | PAA | keiner | | + | |
| " | " | div.unpolar (i) | + | | |
| " | PAI | keiner | | | + |
| " | " | div.unpolar (i) | | + | |
| " | PI | keiner | | + | |
| " | " | div.unpolar (i) | + | | |
| PPSU | PAA | keiner | | | + |
| " | " | PTFE−F+PS (z) | + | | |
| PES | PC | — | | | + |
| " | PC+PAA−F | — | | + | |

-continued

Plastic Sliding Pairs on an RMH Roller Bearing Test Stand

| Paarung | | | Durchschnittsbewertung hinsichtlich Verschleiss, Reibwert und Belastbarkeit | | |
|---|---|---|---|---|---|
| Haupt-partner I | Haupt-partner II | Hilfs-partner (i), (z) | sehr gut | gut | fur be-stimmte Be-dingungen |
| " | PC | PE+PTFE (i) | + | | |
| " | PETP | — | | | + |
| " | PETP+PE | — | | + | |
| PPO | PC | PP+PIB (i) | | | + |
| PPO | PC | PP+PIB (z) | | + | |
| PAA | PC | PE (i) | + | | |
| PPS+PAA—F | PPO | PS (i) | | + | |
| PBTP+PE | PC | PVDC—F +PS (z) PTFE—F | | + | |
| PTFE gefullt | PTFE gefullt | PI (z) | + | | |
| PP(+PIB+PE) | PP(+PIB+PE) | PPS+PAA—F (z) | | | + |

(i) = main partner integrated
(z) = separate intermediate bushing
Key for above Table
Paarung = Pairing
Durchschnittsbewertnung hinsichtlich Verschleiss, Reibwert und Belastbarkeit = Average evaluation in respect to wear, friction and load-carrying capacity
Hauptpartner = Main partner
Hilfspartner = Auxiliary partner
sehr gut = very good
gut = good
fur bestimmte Bedingungen = For certain conditions
gefullt = Filled
keiner = None
div.unpolar = Various nonpolar

TABLE 2
Arrangement of polymers, containing cyclic components, according to the bonding structure (a) Monovalent cyclic chain polymers diagrammatic representation:

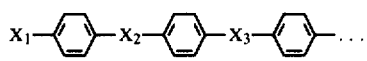

(b) Chain polymers as polyheterocycles ("semi-ladder polymers")

diagrammatic representation:

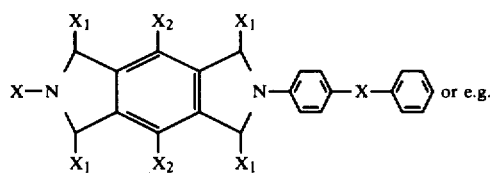

(c) Chain polymers as monovalent polyheterocycles diagrammatic representation:

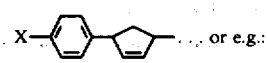 or e.g.:

TABLE 2-continued
Arrangement of polymers, containing cyclic components, according to the bonding structure

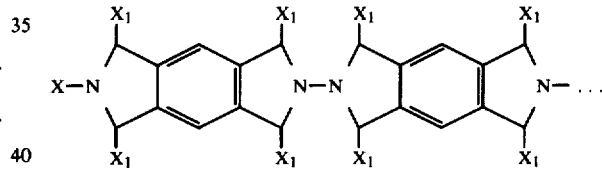

(d) Fully cyclic (at least divalent) chain polymers. ("ladder polymers")

diagrammatic representation:

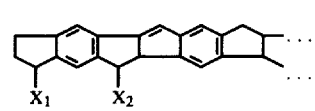

TABLE 2a
Examples of monovalent cyclic chain polymers

Polyaryl oxides, e.g. polyphenylene oxide

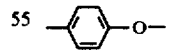

e.g. polyaryl ether

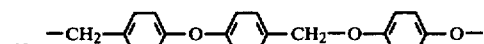

e.g. poly(2,6-dimethylphenylene oxide)

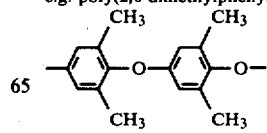

Polyaryl sulfides, e.g. polyphenylene sulfide

TABLE 2a-continued
Examples of monovalent cyclic chain polymers

—⟨⟩—S— polyaryl sulfones
polyaryl ether sulfones
polyaryl sulfonates
with, for example, the structures

[structure: phenyl-SO2-phenyl-O—]

[structure: phenyl-SO2-phenyl-O-phenyl-C(CH3)2-phenyl-O—]

[structure: phenyl-O-phenyl-SO2-phenyl-phenyl-SO2—]

[structure: -SO2-phenyl-SO2-O-phenyl-C(CH3)2-phenyl-O—]

polyaryl amines    basic structure  —⟨⟩—NH—

TABLE 2a-continued
Examples of monovalent cyclic chain polymers polyazophenylenes    basic structure  —⟨⟩—N=N— polyazomethines - basic structure

[structure: —CH=⟨⟩—CH=N—⟨⟩—N=]

polyaryl carbonate - example of structure

[structure: —O—⟨⟩—C(CH3)2—⟨⟩—O—C(=O)—]

polyaryl esters    examples of the structure
(polyarylates)

[structure: —C(=O)—⟨⟩—C(=O)—O—⟨⟩—O—]

[structure: —C(=O)—⟨⟩—C(=O)—O—⟨⟩—C(CH3)2—⟨⟩—O—]

(for additional examples, see, for example, "Behr, Hochtemperaturfeste Kunststoffe"(high temperature resistant plastics), published by Hanser,1969)

polyarylamides    example of the structure

[structure: —NH—⟨⟩—NH—C(=O)—⟨⟩—C(=O)—]

TABLE 2b
Examples of chain polymers in the form of polyheterocyles ("semi-ladder polymers")

polyimides
polyesterimides
polyamideimides
polythiodiazopyrazinimides
polyimidazoles
polyoxazoles
polythioazoles
polyboronimidazoles
polytetrazopyrenes
polyhydrazides
polyoxdiazoles
polydiazoles
polytriazoles
polyoxazolines
polyoxazolidones
polypyrazoles
polytetrazoles
polyhydantoins
polydiketopiperazines
polyquinoxalines
polyquinoxaline diones
polyquinoxalones
polyoxazines
polyazinones
polyimidazopyrolenes
polyimidazobenzophphenanthrolines
polyisoindoloquinazolindiones
polybenzimidazoles
polyboronimidazoles
polyoxazoles
polythioazoles
polytetrazopyrenes In regard to some examples of polyimides and polyazo compounds and their copolymers, reference is made to "Behr, Hochtemperaturfeste Kunststoffe (High-Temperature Resistant Plastics), published by Hanser, 1969." Some examples of such compounds are shown in the continuation pages 2b (continuation page 1-2).

Continuation Page -1-

Examples of the Structure of some Polyimide Groups

TABLE 2b-continued
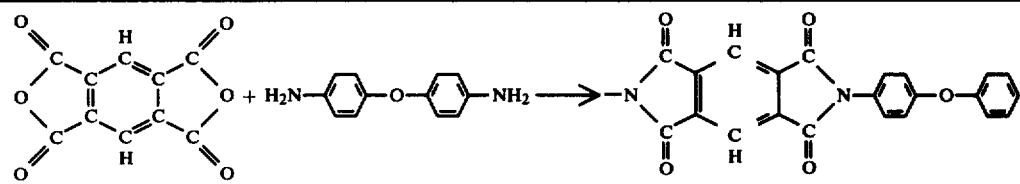
normal polyimide
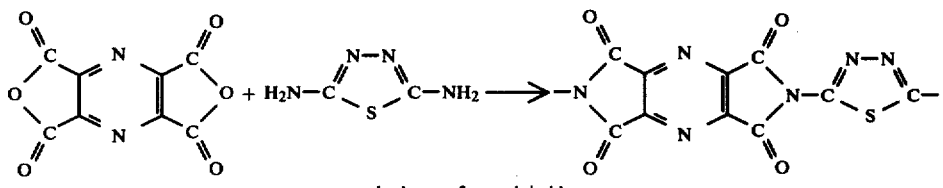
hydrogen-free polyimide
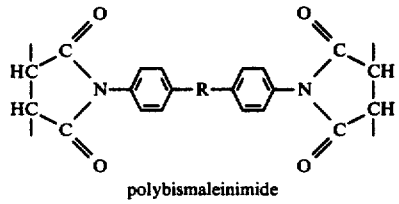
polybismaleinimide
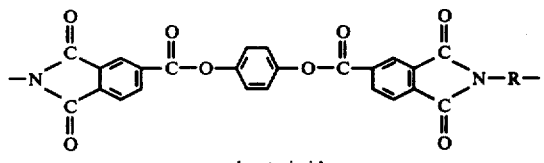
polyesterimide
Continuation page -2-
Examples of the Structure of some Polybenzimidazoles
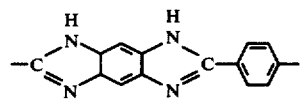
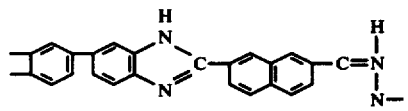
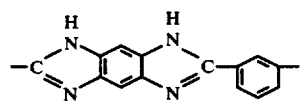
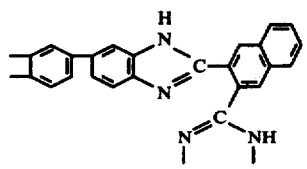
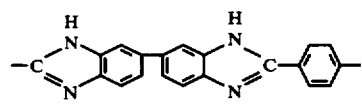
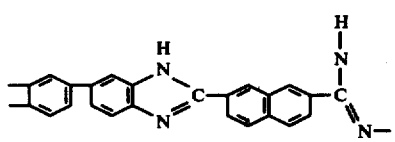
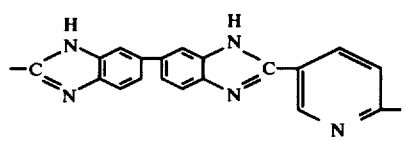
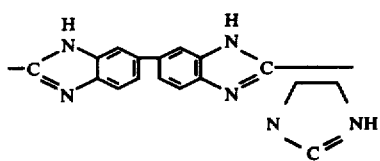

TABLE 2b-continued

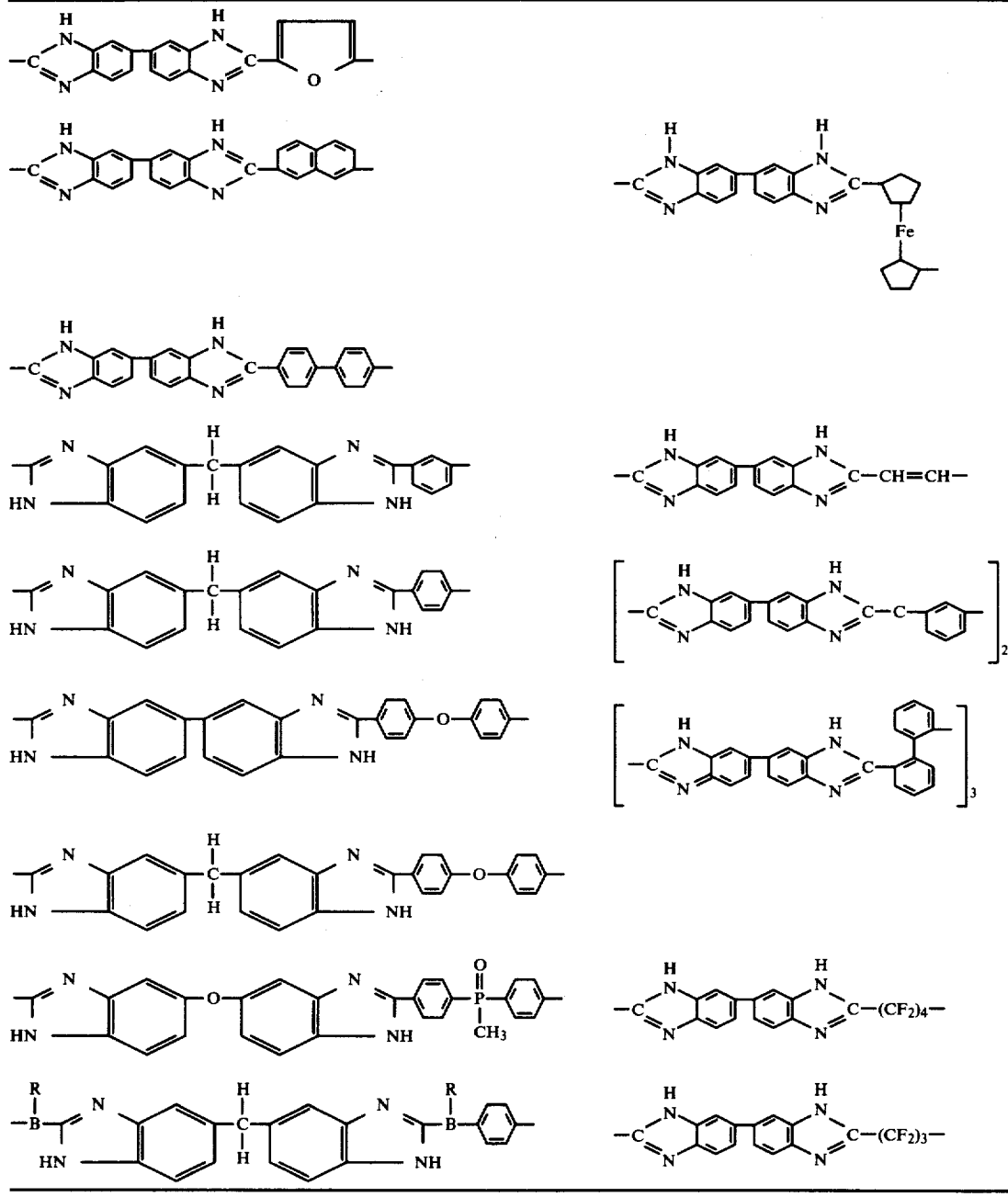

| TABLE 2c |
|---|
| Examples of chain polymers in the form of monovalent polyheterocycles |
| polyhydrazides |
| polyoxdiazoles |
| polythiadiazoles |
| polytriazoles |
| polytetrazoles |
| polyhydantoins |
| polypyrazoles |
| polyoxazolines |
| polydiketopiperazines |

| TABLE 2d |
|---|
| Examples of fully cyclic chain polymers ("ladder polymers") |
| polyquinoxalines |
| polyquinoxaline diones |
| polyquinoxalones |
| polyoxazines |
| polyoxazinones |
| polyimidazobenzophenanthroline |
| polyisoindaloquinazoline diones |
| polyimidazopyrolones |
| cyclized polyacrylonitrile |
| some polyimides |
| some polyesterimides |
| some polyamideimides |
| polybenzimidazoles |
| polyoxazoles |

TABLE 2d-continued

Examples of fully cyclic chain polymers ("ladder polymers")

polythiazoles
polyboronimidazoles
polytetrazopyrenes
polypyrazoles
polyhydrazines
polyoxdiazoles
polyoxtriazoles
polypyrones

TABLE 3

Explanations of "Key for Abbreviations" as well as of the Tables and of the plastics terminology used in the text.

(A) General

It is customary, particularly in the US patent literature, to provide an accurate chemical definition of the plastics used and to refer, wherever possible, to the chemical starting materials from which they were produced.

This is not possible here because of the very large number of materials mentioned. It is therefore stated quite generally that the chemical descriptions given, in so far as they define a broad chemical class, are to be understood in such a way that (a) in the case of the main sliding partners, those products from the respective class are meant, which are usually employed in plastics technology and which are suitable for the production of molded articles according to the methods of plastics processing.

(b) in the case of auxiliary sliding partners, the products described in "(a)" are also generally meant. In special cases however, they may also be monomers or oligomers of these products.

(B) Standardized Abbreviations and Abbreviations Customarily Used in the Trade

The abbreviations, given in the "Key for Abbreviations", and also the actual chemical descriptions used there as well as in the text of the description and in the Tables, shall (a) refer to all those plastics which are characterized in the DIN, ASTM and ISO standards with these abbreviations and these actual chemical descriptions, or which are customarily used in plastics processing under this terminology, (b) also characterize those plastics, for which the abbreviations admittedly have not yet been standardized, but for which either the abbreviations or the actual chemical descriptions are customarily used, by those skilled in the art, for the groups of materials employed in plastics technology for the production of plastics products.

(C) Trade Names

For further clarification, some trade names (incomplete) are given in the following for the plastics characterized by the abbreviations or the actual chemical descriptions used:

HDPE = high density polyethylene; MARLEX, HOSTALEN, LUPOLEN
PA 6 = polyamide from caprolactam; GRILON, ULTRAMID-B
PA 66 = polyamide from hexamethylenediamine and adipic acid: ZYTEL, ULTRAMID-A, NYLON 66
PA 11 = polyamide from aminoundecanoic acid: RILSAN
PA 12 = polyamide from laurin lactam: GRILAMID, VESTAMID
PAA-F = polyarylamide fiber: KEVLAR, MOMEX, ARENKA
PBTP = polybutylene terephthalate: ARNITE-T, CELANEX ULTRADUR
PC = polycarbonate; MACROLON, LEXAN
PE = polyethylene: LUPOLEN, HOSTALEN, ALATHON
PETP = polyethylene terephthalate: ARNITE-A
POM hp = polyoxymethylene homopolymer: DELRIN
POM cp = polyoxymethylene copolymer: HOSTAFORM-F, KEMATAL,
PPO = polyphenylene oxide: "PPO" (General Electric)
PPO/PS = polyphenylene oxide (generally poly(2,6-dimethyleneoxide) in admixture with polystyrene: NORYL
PPS = polyphenylene sulfide: RYTON
PPSU = polyphenylenesulfone: BAKELITE-P-1700, POLYMER-360, UDEL
PU = polyurethane; ELASTOLLAN, DESMOPAN
PTFE = polytetrafluoroethylene: TEFLON, HOSTAFLON, FLUON
UHMWPE = ultrahigh molecular weight polyethylene: HOSTALEN-GUR
PAA = polyarylamide: NOMEX, Q-2, TROGAMID-T,
PI = polyimide: VESPEL, SP-POLYMER, POLYMER-XPE, KINEL
PIB = polyisobutylene:
PP = polypropylene: HOSTALEN PP, DAPLEN,
PS = polystyrene: STYRON, HOSTYREN, BASF-POLYSTYROL
PVDC = polyvinylidene chloride: SARAN
PAI = polyamideimide: TORLON, A-I-POLYMER
PES = polyether sulfone: VICTREX
poly-p-xylylene: PARYLEN
polyimidazopyrolones: PYRONE
polybenzimidazoles: IMIDITE, AF-R-100

TABLE 4

For a better explanation of the requirements according to the claims, some examples for the inventive tribological pairings are mentioned in the following:

(A) Combination POLAR/NONPOLAR/POLAR

Requirements according to the claims:

Both main sliding partners are polar chain polymers and contain different cyclic compounds and/or different atoms or chemical groups which are coupled to the cyclic part.

In the cyclic part of the molecule or directly connected to the cyclic part, atoms from the groups V and/or VI of the periodic system of the elements are arranged in at least one of the main sliding partners.

The auxiliary sliding partner is nonpolar.

Examples of such pairings are described in the subsequent pages 36–49 of this table.

(B) Combination NONPLAR/POLAR/NONPOLAR

Requirements according to the claims:

Both main sliding partners are nonpolar.

The auxiliary sliding partner is a polar chain polymer and contains cyclic compounds.

In the cyclic part of the molecule or directly connected to the cyclic part, atoms from the groups V and/or VI of the periodic system of the elements are arranged.

Examples of such pairings are described in the subsequent pages 49–52 of this table.

(A) Examples of the pairing POLAR/NONPOLAR/POLAR Main sliding partners

The two polar main sliding partners consist of homopolymers or copolymers or polymer mixtures and they also contain lubricants, fillers (e.g. organic and inorganic powders) and/or reinforcing materials (e.g. organic and inorganic fibers, felt, fabrics). In this sense and in the sense according to the invention, the following have been found to be good base materials for the main sliding partners:

TABLE 4 a

Group "CS":
PPS, PPS + PES, PPS + PPSU, PES, PES + PPSU, PPSU,
Group "CO":
PPO, PPO + PS, PC, PATP
Group "NCO":
PU with cyclic parts in the chain,
PU with cyclic parts in the chain + linear PU,
PU with cyclic parts in the chain + POM
Group "CN":
PAA, PAA + PA, PAI, PAI + PA, PI, PU + PAI, PI + PAA, PI + PA, PBIA, PBIA + PI The following results were obtained;

TABLE 4 b

| Main Sliding Partner 1 | Main Sliding Partner 2 | Result |
|---|---|---|
| A plastic from the Gr. "CS" | A plastic from the Gr. "CN" | very good |
| from the Gr. "CO" | from the Gr. "CN" | very good |
| from the Gr. "NCO" | from the Gr. "CN" | good |
| from the Gr. "CS" | from the Gr. "CO" | good |
| from the Gr. "CS" | from the Gr. "NCO" | good/very good |
| from the Gr. "CO" | from the Gr. "NCO" | good |
| A plastic from one of these groups | Another plastic from the same group | good to unsatisfactory, depending on the requirements |

It is also successful to combine in one or in both main sliding partners the above-mentioned plastic groups or different individual plastics from a single one of these groups, or a single one of these plastics together with linear plastics. Advantageously, this combination is made in macroform. For this purpose, similarly to the constructions of the state of the art, macrostructural synthetic materials which differ chemically from the main sliding partners but have a similar polarity or nonpolarity are set in one or both of the main sliding partners, preferably being arranged so as to project in strip fashion, spirally, cross-like or in island fashion into the friction surface, or being embedded in the form of particles, fibers, felt, fabric. Examples are listed in Table 4c.

TABLE 4 c

Examples of multi-component combinations of polar plastics of which a main sliding partner may consist.
(The meanings of the abbreviations CS, CO, NCO, and CN are in the sense of Table 4 a)

| In a matrix of a plastic of the group | there is set or embedded a plastic (or several plastics) of the group (or groups) |
|---|---|
| CS | CS, however in another chemical structure than the matrix plastic, CO, NCO, CN, PA, POM, PVC, PAN, PMMA |
| CO | CO, however, in another chemical structure than the matrix plastic CS, NCO, CN, PA, POM, PVC, PAN, PMMA |
| NCO | NCO, however in another chemical structure than the matrix plastic, CS, CO, CN, PA, POM, PVC, PAN, PMMA |
| CN | CN, however, in another chemical structure than the matrix plastic CS, CO, NCO, PA, POM, PVC, PAN, PMMA |
| PA or POM or PVC or PAN or PMMA | CS, CO, NCO, CN. |

TABLE 4 c

Examples of multi-component combinations of polar plastics of which a main sliding partner may consist.
(The meanings of the abbreviations CS, CO, NCO, and CN are in the sense of Table 4 a)

| In a matrix of a plastic of the group | there is set or embedded a plastic (or several plastics) of the group (or groups) |
|---|---|
| CS | CS, however in another chemical structure than the matrix plastic, CO, NCO, CN, PA, POM, PVC, PAN, PMMA |
| CO | CO, however, in another chemical structure than the matrix plastic CS, NCO, CN, PA, POM, PVC, PAN, PMMA |
| NCO | NCO, however in another chemical structure than the matrix plastic, CS, CO, CN, PA, POM, PVC, PAN, PMMA |
| CN | CN, however, in another chemical structure than the matrix plastic CS, CO, NCO, PA, POM, PVC, PAN, PMMA |
| PA or POM or PVC or PAN or PMMA | CS, CO, NCO, CN. |

It is impossible within the space provided in the present pages to list all multi-component combinations given by the Table 4c or even to mention all possibilities of pairings, when one or both main sliding partners consist of such multi-component combinations. Accordingly, only a few examples can be mentioned in Table 4d.

TABLE 4 d

Examples of pairings of polar main sliding partners, at least one of which being a multi-component combination.
(c) = a chain polymer containing fully cyclic or cyclic groups
(l) = a linear polymer which contains no cyclic groups

| Main Sliding Partner 1 | | | | Main Sliding Partner 2 | | | |
|---|---|---|---|---|---|---|---|
| The matrix consists of | | The intercalation consists of | | The matrix consists of | | The intercalation consists of | |
| the group | and is | the group | and is | the group | and is | the group | and is |
| CS | PPSU (c) | CS | PPS-P (c) | CN | PI (c) | CN | PAA-F (c) |
| CS | PPS (c) | CN | PAA-F (c) | CN | PI (c) | CN | PA 12 (l) |
| CS | PPS | | glass fibers | CN | PI | NCO | PU-R |

TABLE 4 d-continued

Examples of pairings of polar main sliding partners, at least one of which being a multi-component combination.
(c) = a chain polymer containing fully cyclic or cyclic groups
(1) = a linear polymer which contains no cyclic groups

| Main Sliding Partner 1 | | | | Main Sliding Partner 2 | | | |
|---|---|---|---|---|---|---|---|
| The matrix consists of | | The intercalation consists of | | The matrix consists of | | The intercalation consists of | |
| the group | and is | the group | and is | the group | and is | the group | and is |
| CS | (c) PES | CN | PA66-R (1) | CO | (c) PPO | CO | (c) PETP-R |
| CS | (c) PES | CN | PAI-R (c) | CO | (c) POM | CO | (c) PBTP-R |
| CN | (c) PA11 (1) | CN | PAA-F (c) | CO | (c) POM (1) | CO | (c) PETP-F (c) |
| CN | PAA (c) | NCO PU-1 plus CO POM-1 CN | -R PA6-R | CS | PES (c) | — | — |
| CN | PBIA (c) | plus CN | PAA-F | CO | PC (c) | CS | PPS-K (c) |
| CO | PC (c) | CO | PBTP-R (c) | CS | PPS (c) | CN | PAA-F (c) |
| CO | PBTP (c) | CCl | PVC-R (1) | CN | PAN (1) | CS | PPS-K (c) |
| CO | PPO (c) | CO | PMMA-R (1) | NCO | PU (c) | CN | PA12-R (1) |

The abbreviations used in Table 4 d but not yet explained have the following meanings:
-F = fibers, felt, mats, fabrics, knitted materials
-K = granules, approximately in the size range of 0.1 to 3 mm
-P = powders, approximately in the size range of 0.001 to 0.1 mm
-R = space fillers which fill out the spaces left unfilled by the main sliding partner, preferably in the form of strips, spirally, cross-like or in the manner of islands.

Further to Table 4d, it must be noted that the requirement that the main sliding partners should have different cyclic compounds and/or different atoms or chemical groups which are coupled to the cyclic parts is even met when the main sliding partners contain several of these compounds and at least two of them are different and their surface portions in the two sliding partners are sufficient for the tribological effectiveness. For this purpose, frequently a portion of one-fifth at the surface will be sufficient. In preferred embodiments, the portion is one-half and more. The following pairings are examples for the above:

TABLE 4 e

| Main sliding partner 1 | Main sliding partner 2 | Tribologically significant surface Portions are to be provided for | |
|---|---|---|---|
| PI with PAA-F | PPS with PAA-F | PI | PPS |
| PPO with PA12-R PETP-F | PPO with PWS-R | PA12 containing PETP | PES |
| PAA no combination | PAA with PPSU-R | PAA | PPSU |

Auxiliary Sliding Partner

The auxiliary sliding partner is nonpolar. The auxiliary sliding partner may either be an independent component in the form of a machine element or may run between the main sliding partners, for example, as an intermediate bushing or intermediate foil or intermediate plate. This is possible in radial sliding bearings, axial sliding bearings and flat sliding bearings. In the case of gear pairings or when cam and lever slide in each other, the auxiliary sliding partner can hardly be an independent part in the form of a machine element. In these applications, but also in most of the plastic/plastic sliding bearing pairings according to the invention, the nonpolar auxiliary sliding partner will be integrated in one or both main sliding partners.

TABLE 4 f

Nonpolar plastics which preferably serve as auxiliary sliding partners:

PE
UHMWPE
PP
PIB
PS-cross-linked, if nonpolarity is maintained
PTFE
PVDC

TABLE 4 g

Morphological shape, in which the plastics mentioned in Table 4 f may be present:

Individual macromolecules
Macromolecule bundle
Powder (for example, having a size of between 0.001 and 0.1 mm)
Granules (for example, having a size of between 0.1 and 3 mm)
Fibers
Felt
Mats
Fabric
Netting
Foils
Plates, bushings and other molded bodies (for example, strips, spirals)

TABLE 4h

Combinations between chemical and morphological shapes:

Each of the plastics mentioned in Table 4f may form the nonpolar partner either individually or in a single morphological shape in accordance with 4g.
Examples:
  PE - or UHMWPE-powder
  PTFE - fibers
  PP - Fabric
  PS - cross-linked bushings Each of the plastics mentioned in Table 4f may form the nonpolar partner individually, but in different morphological shapes (in accordance with 4g).
Examples:
  Fabric of PTFE fibers with PFTE powder pressed therebetween,
  Fibers and powders of PE in a mixture.

Each of the plastics mentioned in Table 4f may be combined with one or several of the other plastics mentioned in the same table, the chemical construction being different, however, the morphological shapes being equal.
Examples:
  Mixers of PE with PP or PE with PIB or PP with PIB or PE with PP and PIB, the breaking up being performed to the single macromolecule or at least to small macromolecule bundles,
  Mixed fabrics of fibers of PTFE and PVDC,
  Power mixtures of UHMWPE and PTFE.

Each of the plastics mentioned in Table 4f may be combined with one or several of the other plastics mentioned in the same table, the chemical construction as well as the morphological shape being different at least in single ones of the plastics.
Examples:
  Loose mixture of PTFE fibers with PE powder,
  PS foil with embedded PP fibers or fabrics,
  PP bushing with embedded UHMWPE granules,
  Granules of mixtures of PE with PIB with embedded fibers of PVDC and powder of UHMWPE,
  Felt of a fiber mixture PP/PE with a pressed-in PTFE layer,
  Fibers of PVDC or PS or PP or PE with powders of PTFE and/or UHMWPE which are embedded or locked in at the surface,
  Exchanging the chemical constructions in the above examples against other plastics from Table 4f,
  Other combinations of two or more plastics (in accordance with Table 4f) in two or more constructions (in accordance with Table 4g).

TABLE 4i

Examples for possible shapes of nonpolar auxiliary sliding partners, which form independent machine elements: From a single one of the plastics mentioned in Table 4f.
Examples:
  Production of foils, plates, bushings and other molded bodies in accordance with production methods of the plastics technology (for example, casting, pressing, injection molding, extruding, sintering, etc.)
From combinations of chemical and morphological shapes.
Examples:
  Table 4h shows several possibilities for directly obtaining independent molded bodies. Further, Table 4h mentions several intermediate products which, either alone or added to one or several of the plastics according to Table 4f, can be worked to form independent molded bodies in accordance with the known production methods of the plastics technology.

TABLE 4j

Examples for possibilities of integrating the non-polar auxiliary sliding partner or partners in the main sliding partner or partners:

A main sliding partner or both main sliding partners which have the structures indicated in Tables 4a through 4e, or in analogy therewith, contain the auxiliary sliding partners in their entire volume, or at least at their slide surfaces. The auxiliary sliding partner consists, for example, of the plastics in accordance with table 4f in shapes in accordance with table 4g and combinations in accordance with table 4h.

Once again, it is impossible to list all possibilities of combinations. The following examples may suffice, however, it shall be added (a) that both main sliding partners may contain the recited auxiliary sliding partner,
(b) that only one of the recited main sliding partners may contain the auxiliary sliding partners mentioned in connection therewith and the other may contain none,
(c) that both recited auxiliary sliding partners may be combined in one of the main sliding partners,
(d) that, in order to keep this table short, it is understood that the pairings may be interchanged.

| The main sliding partner 1 contains as the auxiliary sliding partner: | The main sliding partner 2 contains as the auxiliary sliding partner: |
| --- | --- |
| UHMWPE powder | PTFE powder |
| PE powder + PTFE powder | PS strips (macrostructure) |
| PTFE fabric | PIB granules |
| PP and PVDC short fibers | PS cross-linked grid + UHMWPE powder |
| PS, filled with UHMWPE powder, in the form of a spiral | Coarsely meshed knitted fabric (embedded!) of PVDC filled with PTFE powder |
| A partner of Table 4h | Another partner of Table 4h |

(B) Examples of the pairing NONPOLAR/POLAR/NONPOLAR

Main sliding partner:

The two nonpolar main sliding partners consist of one or several of the plastics mentioned in table 4f.

Each of the main sliding partners may consist of a single or a mixture of these plastics. The plastics according to table 4f may also be present in the different shapes according to table 4g and in combinations according to table 4h.

In order to obtain indications concerning the shapes of nonpolar main sliding partners, the information given in table 4i may be used analogously.

Within the scope of these directions or their analogous interpretation for further material combinations, the nonpolar main sliding partners may consist of the same material (of the same material combination) or of a different material (of a different material combination).

AUXILIARY SLIDING PARTNER

TABLE 4k

Examples for possible shapes of polar auxiliary sliding partners which may represent independent machine elements:

EXAMPLES:

It is referred to tables 4a through 4e. Each of the plastics recited in these tables and each of the multicomponent combinations recited therein may also serve for the production of a polar auxiliary sliding partner, the production methods known from the plastics technology being used.

TABLE 4l

Examples for possibilities to integrate the polar auxiliary sliding partner or partners in the nonpolar main sliding partner or partners:

Polar plastics which preferably serve as auxiliary sliding partners:

See the materials and multi-component combinations listed in tables 4a through 4e.

Morphological shapes in which these materials may be present:

See the shapes listed in table 4g which analogously also apply to polar plastics.

Combinations between chemical construction and morphological shape:

Everything that has been stated in table 4h concerning nonpolar plastics applies analogously to polar plastics.

It does not require much thinking to replace the nonpolar plastics recited in the examples with polar plastics.

Some Examples:

Once again, it is impossible to list all possibilities of combinations. The following examples may suffice, however, it shall be added (a) that both main sliding partners may jointly contain the recited auxiliary sliding partner, (b) that only one of the recited main sliding partners may contain the auxiliary sliding partner mentioned in connection therewith, and the other may contain none, (c) that both recited auxiliary sliding partners may be combined in one of the main sliding partners, (d) that it is understood that the pairings can be interchanged.

| The nonpolar main sliding partner 1 contains as the polar auxiliary sliding partner: | The nonpolar main sliding partner 2 contains as the polar auxiliary sliding partners: |
|---|---|
| PPS powder | PAA spirals, islands (macrostructure) |
| PES granules | PAA fibers or felt, fabric |
| PC strips, filled with PPS powder | PI islands |
| PPO + PS grid | PAI foil chips |
| PU (partially cyclic) strips alternated with PATP strips | PES strips alternating with PI strips |
| PBIA powder | PPS powder |

I claim:

1. In a tribological system with plastic/plastic pairings, in which plastics carry out motions in sliding friction relative to one another and in which at least one of the main sliding partners or auxiliary partners is a plastic, containing polar, cyclic compounds, in which the cyclic part of the molecule on at least one side is coupled directly to an atom of Group V or of Group VI of the Periodic System of the elements, or in which the rings contain the atoms mentioned, the improvement which comprises said polar plastic materials containing one or more cyclic compounds selected from the group consisting of:

(a) monovalent cyclic chain polymers, (b) chain polymers in the form of polyheterocycles, (c) chain polymers in the form of monovalent polyheterocycles, (d) fully cyclic chain polymers, and (e) homopolymers, copolymers, polymer mixtures from groups (a) to (d);

and wherein both main sliding partners are polar and contain different cyclic compounds, are different atoms or chemical groups which are coupled to the cyclic part, in which case the auxiliary sliding partner is nonpolar, or both main sliding partners are nonpolar and the auxiliary sliding partner is polar and contains said cyclic compounds.

2. The tribological system according to claim 1 wherein the nonpolar sliding partners either are inherently nonpolar or act in a nonpolar fashion towards the outside as a result of internal neutralization of the polarities of individual molecules.

3. The tribological system according to claim 1 or 2 wherein the auxiliary sliding partner in the form of an intermediate bushing or an intermediate film, runs between the main sliding partners.

4. The tribological system according to claim 1 or 2 wherein the auxiliary sliding partner is integrated in one of the main sliding partners in such a manner that parts of it, or degradation products or conversion products of it, are continually given off in the friction zone.

5. The tribological system according to claim 1 or 2 wherein the auxiliary partner consists of a synthetic material.

6. The tribological system according to claim 1 or 2 wherein the auxiliary partner consists of oligomeric or monogomeric substances.

7. The tribological system according to claim 1 or 2 wherein at least two of the sliding partners have equidirectional polarity.

8. The tribological system according to claim 1 or 2 wherein one of the sliding partners contains atoms of sulfur in its molecule and one of the other sliding partners atoms of oxygen.

9. The tribological system according to claim 1 or 2 wherein one of the sliding partners contains atoms of sulfur in its molecule and one of the other sliding partners those of nitrogen.

10. The tribological system according to claim 1 or 2 wherein one of the sliding partners contains atoms of oxygen in its molecule and one of the other sliding partners those of nitrogen.

11. The tribological system according to claim 1 or 2 wherein the sliding partners contain two, three, or four types of atoms selected from the group consisting of sulfur, oxygen, nitrogen and phosphorus in its molecule.

12. The tribological system according to claim 1 or 2 wherein one of the sliding partners is a polyphenylene oxide, and one of the other sliding partners is an aromatic polyamide, a polyimide, a polyamideimide, a polybenzimidazole, a polyalkylene terephthalate and the auxiliary sliding partner consists of polyalkylene, polytetrafluoroethylene, an oligomeric hydrocarbon or a monomeric hydrocarbon.

13. The tribological system according to claim 1 or 2 wherein one of the sliding partners is a sulfur-containing synthetic material, which is a polyaryl sulfone, a polyaryl sulfide, or a polyaryl sulfonate, and one of the other sliding partners is an aromatic polyamide, a polyimide, or a polyamideimide, a polybenzimidazole, or a polyalkylene terephthalate and the auxiliary sliding partner consists of polyalkylene, polytetrafluoroethylene, a low molecular weight oligomeric hydrocarbon or a monomeric hydrocarbon.

14. The tribological system according to claim 1 or 2 wherein the materials mentioned as sliding partners are present in the pure state, or contain conventional additives, fillers, lubricants and reinforcing materials.

15. The tribological system according to claim 1 or 2 wherein the nonpolar partner, the nonpolar partners, the main sliding partner, or the auxiliary sliding partner are composed of a polymer selected from the group consisting of polypropylene, polystyrene, polyisobutylene polyethylene, polyvinylidene chloride, and polytetrafluoroethylene.

16. The tribological system according to claim 1 or 2 wherein a nonpolar partner consists of a material selected from the group consisting of polyethylene, polypropylene, polyisobutylene, polytetrafluoroethylene, and polyvinylidene chloride and mixtures thereof.

17. The tribological system according to claim 1 wherein the auxiliary partner runs as an intermediate bushing between the main sliding partners, and wherein the main sliding partner is constructed of fibers, felt, fabric, or netting.

18. The tribological system according to claim 1 wherein at least one of the auxiliary sliding partners in macroform are mounted in one or both main sliding partners, the auxiliary sliding partners being arranged so as to project into the friction surface.

19. The tribological system according to claim 1 wherein macrostructural synthetic materials, which differ chemically from the main sliding partners but have a similar polarity or nonpolarity, are set in at least one of the main sliding partners and are arranged so as to project into the friction surface.

20. The tribological system according to claim 1 wherein the materials, macrostructurally set in the main sliding partners, consist of a synthetic material.

21. The tribological system according to claim 1 wherein the friction surfaces of the main sliding partners or the auxiliary sliding partners are interrupted by slits, which run stripwise at right angles to the direction of friction or are arranged spirally or cross-shaped.

* * * * *